(12) United States Patent
Katagiri et al.

(10) Patent No.: US 6,562,500 B2
(45) Date of Patent: May 13, 2003

(54) FUEL CELL HUMIDIFICATION SYSTEM

(75) Inventors: Toshikatsu Katagiri, Wako (JP); Hiroshi Shimanuki, Wako (JP); Yoshio Kusano, Wako (JP); Motohiro Suzuki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 261 days.

(21) Appl. No.: 09/774,350

(22) Filed: Jan. 30, 2001

(65) Prior Publication Data

US 2001/0012575 A1 Aug. 9, 2001

(30) Foreign Application Priority Data

Feb. 3, 2000 (JP) ......................................... 2000-026682

(51) Int. Cl.⁷ ................................................ H01M 8/04

(52) U.S. Cl. ............................... 429/22; 429/25; 429/12

(58) Field of Search ............................... 429/23, 22, 24, 429/25, 12, 13, 39, 20, 26; 261/142, 70; 96/7, 10, 13; 244/118.5

(56) References Cited

U.S. PATENT DOCUMENTS 6,379,829 B1 * 4/2002 Kurita ......................... 429/17

* cited by examiner

Primary Examiner—Patrick Ryan
Assistant Examiner—M. Wills
(74) Attorney, Agent, or Firm—Lahive & Cockfield, LLP

(57) ABSTRACT

A fuel cell humidification system is provided capable of operating the fuel cell at the optimum dew-point state when the fuel cell 1 is restarted. The fuel cell system having a humidification apparatus 6 for humidifying dry air by a water content in an discharge gas after the reaction in the fuel cell comprises an air supply line 3 for supplying dry air to the fuel cell and an gas discharge line 5 for discharging the discharge gas from the fuel cell, and the humidification apparatus 6 is provided across these air supply line and the gas discharge line. A communication line is also provided so as to be able to form a closed loop between the air supply line and the gas discharge line. When the fuel cell is stopped, the closed loop is maintained. When the fuel cell is restarted, the supercharger 17 and the heater 21 are activated for circulating the air in the closed loop and for raising the air temperature, and, after adjusting the dew-point, the fuel cell 1 converted into the normal load operation.

9 Claims, 3 Drawing Sheets

FUEL CELL HUMIDIFICATION SYSTEM

BACKGROUND OF THE INVENTION

1. Field of the Invention

The present invention relates to a fuel cell humidification system and particularly relates to a fuel cell humidification system which allows safe operation of the fuel cell under optimum conditions at the time of re-starting the fuel cell.

2. Background Art

Conventionally, a fuel cell provided with a solid polymer membrane is known. In such a type of fuel cell, power is conducted by electrons generated by a chemical reaction between externally supplied oxygen and hydrogen, flowing in the solid polymer membrane. In order to conduct efficient power generation, the solid polymer membrane should be highly conductive so that resistance to the movement of electrons generated by the reaction should be sufficiently low.

The reaction in the fuel cell generates water, and gas discharged from the fuel cell after the reaction contains a considerable amount of moisture. Accordingly, as disclosed in Japanese Patent Application. First Publication No. Hei 6-132038, a humidification apparatus for humidifying a reaction gas used for the reaction in the fuel cell is proposed by applying the gas discharged after the reaction as a humidification gas.

However, although the above-described conventional humidification system is advantageous in utilizing the discharged gas effectively, the problem arises in this humidification system that, when the atmospheric temperature in that humidification system falls due to stopping of the fuel cell, the moisture held in the lines of the fuel cell and the humidification system condenses. Accordingly, since the humidity in the fuel cell is decreased, the problem arises that the dew-point in the fuel cell becomes lower than that required for the normal operation and the insufficient humidity leads to the low efficiency of the fuel cell.

SUMMARY OF THE INVENTION

Therefore, the object of the present invention is to provide a fuel cell humidification apparatus, capable of providing the optimum operation of the fuel cell when the fuel cell is restarted.

According the first aspect, a fuel cell humidification system comprising, a fuel cell (for example, the fuel cell 1 in the embodiment) provided with an air supply line (for example, the air supply line 3 in the embodiment) for supplying air to said fuel cell and a gas discharge line (for example, the gas discharge line 5 in the embodiment) for discharging gas discharged from the fuel cell, a humidification apparatus (for example, the humidification apparatus 6 in the embodiment) including a heater (for example, the heater 21 in the embodiment) disposed across both of said air supply line and said gas discharge line connected to the fuel cell for humidifying air to be supplied to said fuel cell by water content in said gas discharged from said fuel cell, a control device (for example, the control device 27 in the embodiment) for overall control of the fuel cell humidification system, an air pressure device (for example, the supercharger 16 and the motor 16 in the embodiment) disposed in said air supply line upstream of the humidification apparatus for supplying air, a switching device (for example, the three way valve 25a in the embodiment) disposed in said air supply line upstream of said humidification apparatus and a switching apparatus (for example, the three way valve 25b in the embodiment) disposed in said gas discharge line downstream of said humidification apparatus, and a communication line (for example, the communication line 26 in the embodiment) for communicating said air supply line and said gas discharge line by connecting through said switching device of said air supply line and said switching device of said gas discharge line.

In the above fuel cell humidification system, said fuel cell comprises a solid polymer membrane functioning as a solid electrolyte and a conductivity meter attached to said solid polymer membrane for measuring humidity of said solid polymer membrane.

In the above fuel cell humidification system, the fuel cell humidification system further comprises a thermometer disposed close to said fuel cell in said air supply line.

In the above fuel cell humidification system, the pressure device comprises a supercharger and a motor for driving said supercharger.

In the fuel cell humidification system, the switching device in the air supply line comprises a three way valve with a valve control switch for opening or closing the air supply line or communicating the air supply line with the communication line, and the switching device in the gas discharge line comprises a three way valve with a valve control switch for opening or closing said gas discharge line or communicating said gas discharge line with said communication line.

According to another aspect, the fuel cell humidification system provided with the humidification apparatus for humidifying dry air used for a reaction in a fuel cell by water content of a gas discharged from said fuel cell after the reaction, comprises, an air supply line for supplying air to the fuel cell through a air pressure device; a discharge line for discharging said gas discharged from the fuel cell; a control device for overall control of the fuel cell humidification system; a humidification apparatus having a heater provided across both of said supply line and said discharge line; an air pressure device disposed in said air supply line for supplying air to the fuel cell through said humidification device; switching devices provided in said air supply line and in said gas discharge line for switching opening, closing said lines or communicating both lines, wherein, said control device controls switching devices in said air supply line and in said gas discharge line so as to communicate said supply line and said gas discharge line by forming a closed loop and the closed loop is maintained in the closed state when the fuel cell is stopped; and wherein, when said fuel cell is restarted, said control device actuates said air pressure device and said heater for adjusting the dew point of the supply air by circulating air retained in the closed loop and subsequently opens the closed loop and drives the fuel cell in the normal operation.

With the above arrangement, when the fuel cell is stopped, the closed loop is formed by communicating the air supply line and the gas discharge line so as to retain the water content in the system, so that the water content can be contained in the system even when the water content is decreased by condensation of water due to decreasing temperature. When the fuel cell is restarted, the supercharger and a heater are actuated while the closed loop is maintained in the closed state for mixing and heating the air in the closed loop such that the dew point of the air in the system can be recovered, allowing the normal operation of the fuel cell when the closed loop is released.

In the fuel cell humidification system, when the fuel cell is restarted, said control device outputs a restarting signal for actuating the air pressure device and turning on the heater while the closed loop is maintained in the closed state so that the gas temperature in the closed loop is raised and the dew-point of air to be supplied to the fuel cell is raised so as to control the humidity of the solid polymer membrane in a predetermined range while monitoring the humidity by the conductivity meter.

According to the other aspect, a fuel cell humidification method according to claim 6 comprising the steps of: communicating the air supply line and the gas discharge line with the communication line by switching devices so as to form a closed loop including the fuel cell and the humidification apparatus when the fuel cell is stopped, and when the fuel cell is restarted, actuating the pressure device by the motor while the closed loop is maintained in the closed state and turning the heater on by the heater switch for raising the dew-point of the air supplied to the fuel cell while detecting the gas temperature by the thermometer, detecting humidity of said solid polymer membrane by use of the conductivity meter, when the solid polymer membrane attains a predetermined humidity, starting the fuel cell by no-load operation after opening the three way valves for opening the closed loop, and switching the fuel cell from no-load operation to the normal load operation under load.

According to still other aspect, a computer readable recording medium including a program for executing a fuel cell humidification method comprising the steps of: communicating said air supply line and said gas discharge line with the communication line by switching said switching devices so as to form a closed loop including the fuel cell and the humidification apparatus when the fuel cell is stopped; and when said fuel cell is restarted, actuating the air pressure device while the closed loop is maintained in the closed state and turning said heater on by a heater switch for raising the gas temperature while detecting the gas temperature by the thermometer; detecting the humidity of the solid polymer by use of the conductivity meter; predetermined humidity of said solid polymer membrane is attained, starting said fuel cell by no-load operation after switching the three way valves for opening the closed loop; and switching said fuel cell from no-load operation to the normal load operation under load.

DETAILED DESCRIPTION OF THE INVENTION

Hereinafter, the present invention is described with reference to the attached drawings.

Figure 1:
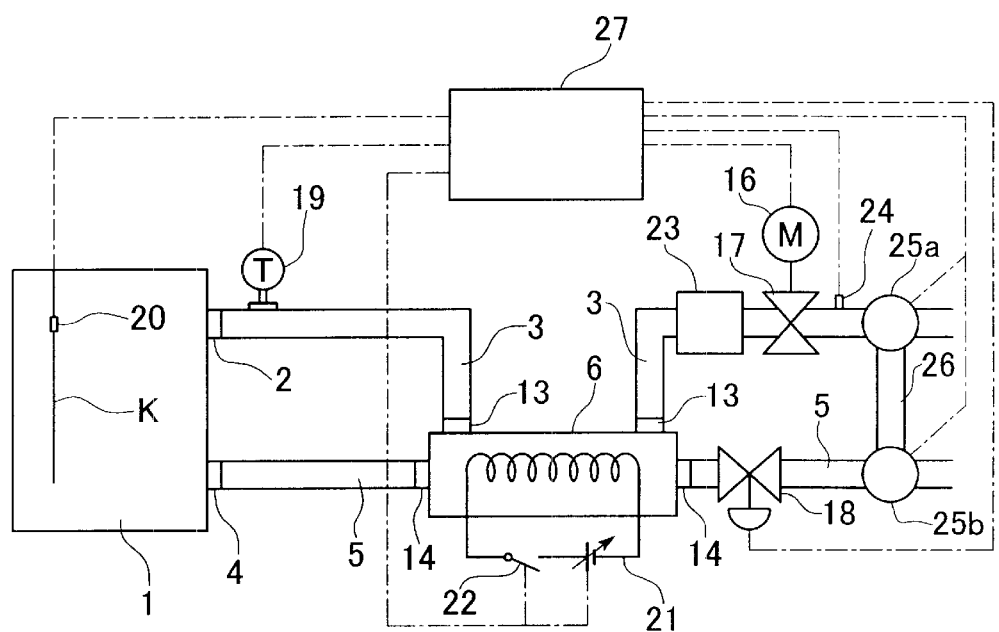
FIG. 1 is a schematic diagram showing the first embodiment of the present invention.

FIG. 1 shows the schematic structure of a fuel cell humidification apparatus of the present invention. This fuel cell humidification apparatus is used for, for example, the fuel cell vehicles.

In FIG. 1, reference numeral 1 denotes a fuel cell comprising a number of solid polymer membrane which functions as a solid electrolyte using proton exchange groups present in the polymer molecules when containing saturated water, with each solid polymer membrane separating, for example, oxygen and hydrogen.

A dry air supply line 3 for supplying dry air used for the reaction is connected to a gas inlet 2 of the fuel cell 1. A gas discharge line 5 for discharging the gas after the reaction from the fuel cell is connected to a gas outlet 4 of the fuel cell 1.

A humidification apparatus 6 for humidifying the dry air by the moisture in the discharge gas is arranged across the above described dry air line 3 and the gas discharge line 5.

Figure 2:
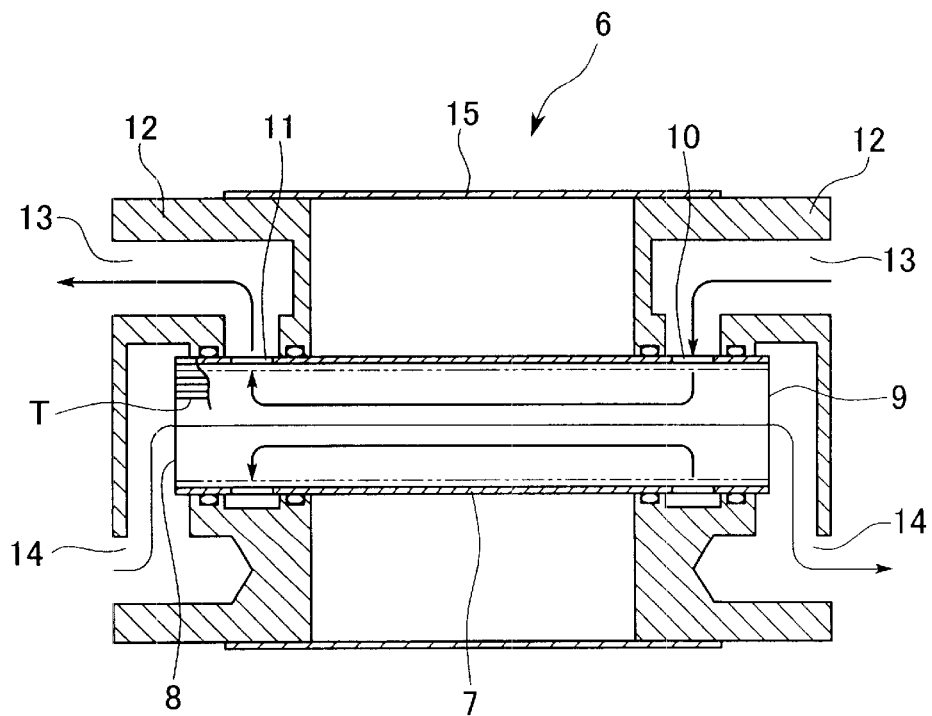
FIG. 2 is a schematic diagram showing the structure of the humidification apparatus according to the first embodiment of the present invention.

A schematic structure of the humidification apparatus 6 is shown in FIG. 2. As shown in FIG. 2, in a cylindrical casing 7, densely packed hollow strings T (porous hollow strings made of a water permeable membrane) are inserted in a cylindrical casing 7, and one end of the casing 7 is formed as an discharge gas inlet 8, and another end is formed as an discharge gas outlet 9. At end portions of the side wall of the casing 7, an air inlet 10 and an air outlet 11 are formed and the air inlet 10 and the air outlet 11 are communicated with spaces between hollow strings T.

Heads 12 and 12 are attached on both ends of the casing 7 in a position such that they cover the air inlet 10 and the air outlet 11, and the air port 13 and the discharge gas port 14 are respectively connected to the air inlet 10 and the air outlet 11, and the discharge gas inlet 8 and discharge gas outlet 9. Here, a cover 15 is provided between these heads 12 so as to cover the casing 7. The air port 13 and the discharge gas port 14 of the humidification apparatus 6 formed as described above are connected respectively to the dry air supply line 3 and the gas discharge line 5. It is noted that one humidification apparatus 6 can be provided with a plurality of casings 7 and that the number of hollow strings can be suitably determined according to the capacity of the fuel cell. It is also noted that the position of the reaction gas port 13 is illustrated in FIG. 2 differently from that of the reaction gas port 13 in FIG. 1, for illustration reasons.

Accordingly, when humidified discharge gas is supplied to each hollow string membrane from the discharge gas port at one end of the casing 7, moisture is condensed in capillaries formed in the hollow string membrane (following the Kelvin's capillary condensation equation), and water is separated and permeates the strings. This permeated water humidifies the dry air when the dry air supplied from the air port 13 is in contact with the permeated water in the humidification apparatus 6. As a result, the dry air discharged from the air port 14 at another end of the casing 7 is humidified.

As shown in FIG. 1, a supercharger 17 driven by a motor 16 is provided in the dry air supply line 3 at upstream of the humidification apparatus 6. This supercharger 17 is used for supplying external air to the fuel cell 1. A pressure regulating valve 18 is provided in the gas discharge line 5 downstream of the humidification apparatus 6. This pressure regulating valve 18 is used for regulating the pressure in the system including the fuel cell and the humidification apparatus.

In between the humidification apparatus and the gas inlet 2 of the fuel cell 1 in the dry air supply line 3, a thermometer 19 is disposed for measuring the temperature of dry air to be supplied to the fuel cell 1. Furthermore, a heater 21 is provided in the humidification apparatus 6, and the heater 21 is turned ON or OFF by a switch 22. A conductivity meter 20 is mounted on an optional solid polymer membrane K in the fuel cell and this conductivity meter 20 detects the wet condition of the solid polymer membrane K. In order to detect the wet condition of the solid polymer membrane, it is possible to apply a technique to obtain the conductivity of the solid polymer membrane K by using a platinum wire as a reference to detect a voltage between the anode and the cathode and an impedance between the solid polymer membrane and the anode and the cathode, as disclosed in Japanese Unexamined Patent Application No. Hei 7-282832.

In the dry air supply line 3A, a heat exchanging device 23 is provided downstream of the supercharger 17, and a water injector 24 is provided upstream of the supercharger. In the dry air supply line 3, an inlet three-way valve 25a and an outlet three-way valve 25b are disposed upstream of the water injector 24 and downstream of the pressure regulating valve 18 in the gas discharge line 5, respectively. These three-way valves 25a and 25b are connected by a communication pipe 26.

Thus, when the inlet three-way valve 25a and the outlet three valve 25b are switched so as to communicate the dry air supply line 3 and the gas discharge line 5 by the communication line 26, the inlet of the dry air supply line 3 and the outlet of the gas discharge line 5 are closed and a closed loop is formed by the dry air supply line 3, the gas discharge line 5, and the communication line 26. In contrast, when respective three-way valves 25a and 25b are switched so as to open the dry air supply line 3 and the discharge gas line 5, the above-described closed loop is opened.

The above-described fuel cell 1, the conductivity meter 20, the thermometer 19, the switch 22 of the heating device 21, the motor 16 of the supercharger 17, the pressure regulating valve 18, the inlet three-way valve 25a, and the outlet three-way valve 25b are connected through a control device 27.

Figure 3:
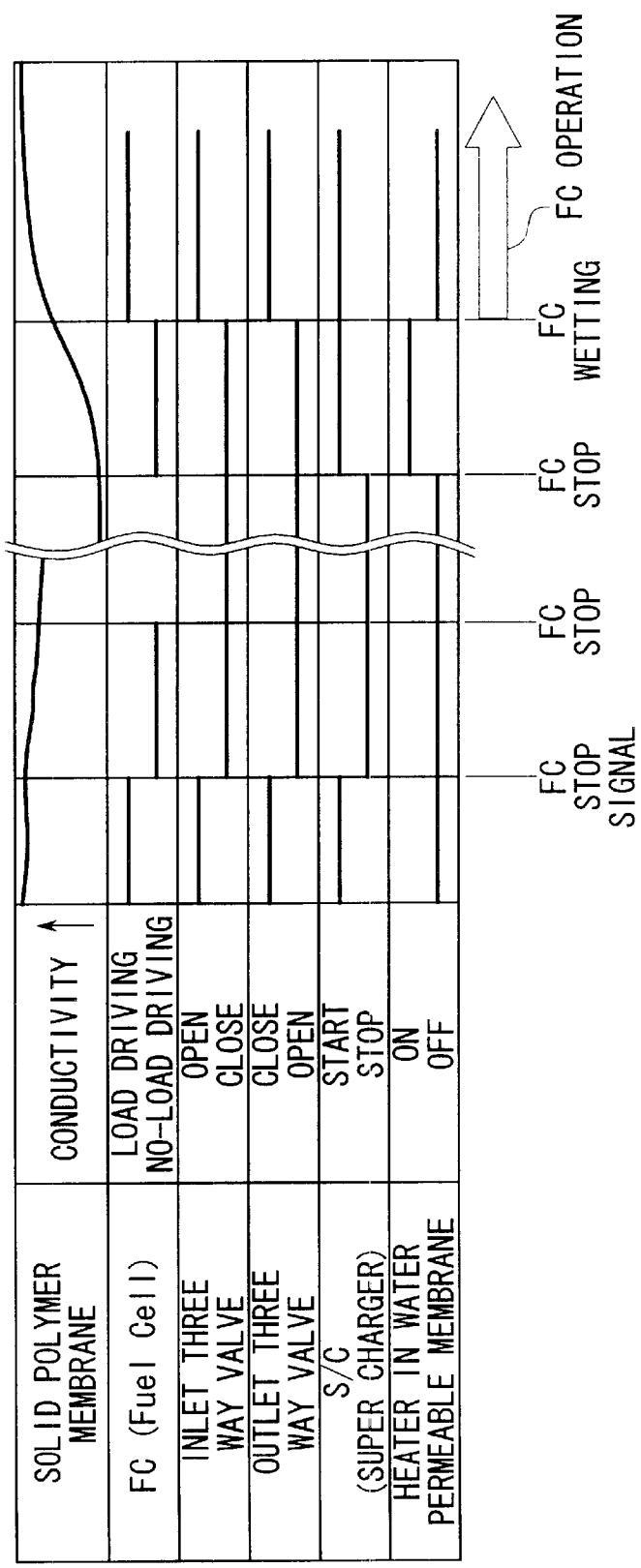
FIG. 3 shows a time chart of the first embodiment of the present invention.

Next, the operation of the system will be explained with reference to the time chart shown in FIG. 3.

First, when the fuel cell 1 is driven under normal driving conditions corresponding to driving under a load, the inlet of the dry air supply line 3 and the outlet of the discharge gas line 5 are both opened by the inlet three-way valve 25a and the outlet three-way valve 25b and the motor of the supercharger 17 is started. At this time, the switch 22 of the heater 21 is in the OFF state.

When the stop signal of the fuel cell 1 is output, the fuel cell changes to non-load operation, and the inlet three-way valve 25a and the outlet three-way valve 25b are switched to the closed loop mode, and the supercharger 17 is stopped. At this time, the heater 21 is in the OFF state.

Thereby, the dry air supply line 3 and the discharge gas line 5 are connected by the communication pipe 26 and a closed loop including the humidification apparatus 6 and the supercharger 17 is formed by the dry air supply line, the discharge gas line 5, and the communication pipe 26.

Accordingly, the moisture in the system is retained in this system including fuel cell and the humidification apparatus. The switching of respective three-way valves 25a and 25b is executed according to timing based on the stop signal by the control device 27 and the fuel cell operation is stopped.

The reason for retaining the moisture in this system is because the water content required for power generation by the fuel cell cannot be secured if this system is maintained in an open state, since the water contained in the solid polymer membrane K of the fuel cell migrates downward as time elapses after stopping the fuel cell. Thus, while the fuel cell is stopping, it is necessary to form the closed loop in order to shut the humidification line at the cathode side.

Next, when the start signal of the fuel cell 1 is output by the control device 27 for restarting the fuel cell, the operation of the supercharger is started by the motor 21 through the control device 27, and the heater 21 is turned ON by the switch 22. Thereby, water retained in the humidification apparatus 6, the dry air supply line 3, and the discharge gas line 5 is sucked into the supercharger 17 and converted to mist. The gas temperature in the system is increased by the adiabatic compression operation of the supercharger 17 and heating of the humidification apparatus by the heater 21 provided in the humidification apparatus 6. Thereby, the required dew point can be achieved rapidly. When the required dew-point is obtained, the fuel cell 1 is activated in the no-load operation.

Here, the no-load operation of the fuel cell 1 means that no electric power is output from the fuel cell itself, while hydrogen and air are supplied respectively to the anode and cathode of the fuel cell at an amount capable of generating a stable but minimum amount of electric power. The load operation means that the fuel cell is in a state capable of generating electric power.

The water circulation conducted in the above-described closed loop continues until the solid polymer membrane K in the fuel cell is sufficiently humidified to be operated under the normal power generation conditions. When the humidity of the solid polymer membrane is low, the conductivity of the solid polymer membrane decreases and also the mobility of the electrons generated by the electrochemical reaction in the fuel cell decreases, which results in decreasing the power generation efficiency. The humidity the solid polymer membrane is controlled by the dew-point.

The dew point represents the temperature at which water vapor begins to condense, or the dew point is the temperature at which air becomes saturated when cooled without addition of moisture or change of pressure. In other words, the water content in the air, in which moisture has been condensed, can be adjusted by circulating by the pressure device and by increasing the temperature of the air by the adiabatic compression action and by the heater. In the present embodiment, the dew point is controlled by actuating the pressure device 17 and by turning the heater 21 of for controlling the humidity of the solid polymer membrane while measuring of the conductivity of the solid polymer membrane and measuring the temperature of the air supplied to the fuel cell by the thermometer 19.

In the present embodiment, the humidity or the water content in the supply air containing condensed water is adjusted by increasing the temperature of the gas system using heat generated by the adiabatic compression of the air by the supercharger 17 and the heater 21.

Practically, the optimum humidity range of the solid polymer membrane is determined by checking whether the conductivity of the solid polymer membrane exceeds a threshold value.

Figure 4:
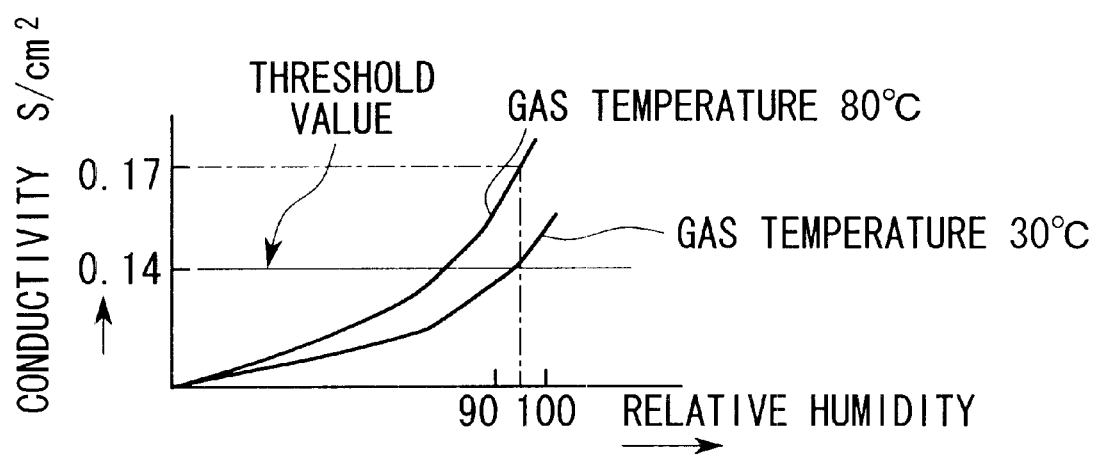
FIG. 4 is a graph showing the relationship between the conductivity of the solid polymer membrane and the relative humidity.

As shown in FIG. 4, threshold values of the conductivity at different temperatures are obtained with increasing relative humidity. For example, when the gas temperature, that is, the inlet gas temperature of the fuel cell 1 is 80° C., the threshold value of the conductivity of the solid polymer membrane K is 0.17 (S/cm$^2$). The threshold value changes to 0.14 (S/cm$^2$) when the inlet gas temperature falls to 30° C. As shown, threshold values are set precisely in accordance with the gas temperature.

Figure 5:
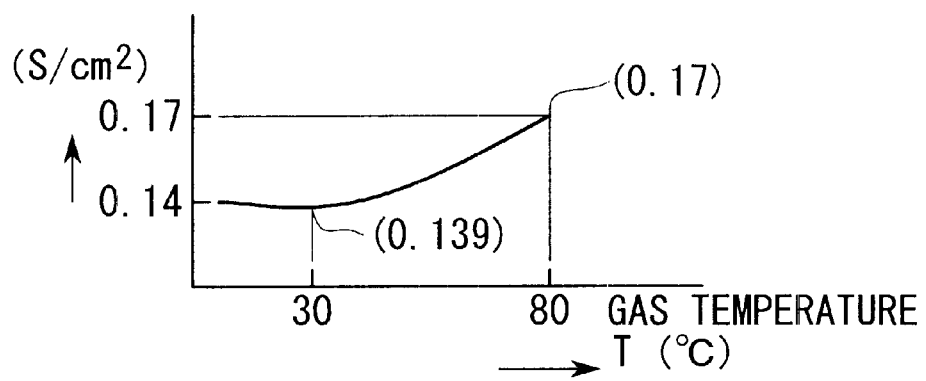
FIG. 5 is a graph showing the threshold value of the conductivity of the solid polymer membrane and the gas temperature.

As shown in FIG. 5, for the present gas temperature detected by the thermometer 19, it is determined that the solid polymer membrane is sufficiently humid when the conductivity of the solid polymer membrane detected by the conductivity meter exceeds a threshold value.

Next, as described above, when the solid polymer membrane K is in a sufficiently humidified state for restarting the operation (that is, the conductivity exceeds the threshold value), the control device 27 executes operations to close the three way valves 25a and 25b for opening the closed loop by closing communication of the dry air supply line 3 and the discharge gas line 5 by the communication line 26 and to start the operation under the load of the fuel cell 1. It is noted however that, when the fuel cell is shifted to the operation under the load, the supercharger is still operating and the heater 21 is turned OFF.

Here, the gas temperature in the system may be regulated by changing the rotational speed of the motor 16 of the supercharger 17 or by controlling the ON-OFF state of the heater 21 so that the gas temperature is increased by increasing the ON state time of the heater, or by increasing the voltage applied to the heater.

The water content in the system can be secured by forming the closed system so that it is not necessary normally to supply water externally. However, if necessary by any chance to provide regulation of the dew-point, it is possible to increase the dew-point by supplying water from the water injector 24 or to decrease the dew-point by discharging excessive water by switching respective three way valves 25a and 25b so as to open both the inlet of the dry air supply line 3 and the outlet of the discharge gas line 25.

Consequently, as shown above in FIG. 1, the present invention provides a fuel cell humidification apparatus having a water permeable-type humidification apparatus 6, in which a closed loop including the fuel cell 1 and the humidification apparatus is formed by communicating the air supply line and the gas discharge line when the fuel cell 1 is stopped, and when the fuel cell 1 is restarted, the gas retained in the closed loop is circulated by use of the air pressure apparatus 17 by the driving motor 16, the dew point of the gas retained in the loop is regulated as a result of the adiabatic compression action, and the fuel cell can be started rapidly to normal operation.

Thus, according to the above-described embodiment, it is possible to eliminate the problem of low generation efficiency of the fuel cell when restarting the fuel cell because of a low water content in the system due to condensation of water in the dry air supply line and in the discharge gas 5 when the fuel cell 1 is stopped and the gas temperature in the system decreases. That is, the fuel cell according to one embodiment of the present invention is capable of being shifted to the operation under load since it is possible to prevent drying of the solid polymer membrane by retaining the water content in the system during the period from the starting of the fuel cell until the shift of the fuel cell to the operation under load.

The water content can be retained by changing the system including the fuel cell 1 to a closed loop by switching the tree way valves 25a and 25b to the closed loop mode so that the water content at the time of stopping the fuel cell can be retained effectively for use at the time of restarting. The present system including the humidification apparatus is advantageous in that the air temperature in the system can be regulated rapidly by use of the supercharger 17, and in that no new massive heating equipment is required. The use of the heater 21 in addition to the adiabatic compression by the supercharger 17 makes it possible to attain the desired gas temperature reliably and rapidly. The present embodiment uses a conductivity meter for estimating the humidity of the solid polymer membrane K, and the power generation efficiency of the fuel cell can be increased by regulating the humidity of the solid polymer membrane more accurately when compared to a simple control of the humidity by the dew-point of the gas.

Furthermore, since the present embodiment is capable of minimizing the time from the stopping the fuel cell to restarting to the normal operation, when this type of fuel system is installed in a fuel cell vehicle, it is possible to reduce the travel time by the battery (EV travel time) and to reduce the load on the battery.

A conventional fuel cell vehicle normally requires a considerable idle time for the fuel cell after starting the vehicle until normal driving of the vehicle by the fuel cell can start. During idling, the vehicle must travel by the battery and if the idling time is long, the energy management of the conventional fuel cell vehicle becomes difficult because the remaining battery charge decreases rapidly.

In contrast, the present embodiment allows rapid switching of the fuel cell vehicle to the load operation by the fuel cell, and the idle time of the fuel cell and reduction of the remaining battery charge can be minimized.

The present invention is not limited to the above embodiment and the humidification apparatus of the present invention can be used, for example, for a humidifying apparatus for hydrogen used as the reaction gas. In addition, a dew-point meter may be provided in place of the conductivity meter at the inlet of the dry air supply line to the fuel cell 1 for detecting the degree of humidification of the solid polymer membrane.

As described above, an effect of the present invention is that the humidification apparatus of the present invention makes it possible to adjust the dew-point in the system at the time of restarting the fuel cell, even when the fuel cell has been stopped and the dew point is lowered by condensation of the water content, by activating the humidification apparatus while forming the closed loop, such that the fuel cell can be rapidly switched to the normal operation after opening the closed loop and using the water content in the system.

The other effect of the present invention is that, when adjusting the dew point in the fuel cell, the humidification apparatus of the present invention is capable of adjusting the gas temperature in the system by use of the heater, so that the dew-point can be adjusted by rapidly increasing the gas temperature in the closed loop.

The other effect is that since the humidification degree of the solid polymer membrane can be determined by measuring the conductivity, it is possible to increase the power generation efficiency in a more accurate manner than the case of estimating the humidification degree by the dew point of the gas in the system.

What is claimed is:

1. A fuel cell humidification system comprising:
    a fuel cell provided with an air supply line for supplying air to said fuel cell and a gas discharge line for discharging gas discharged from said fuel cell;
    a humidification apparatus including a heater disposed across both of said air supply line and said gas discharge line connected to said fuel cell for humidifying air to be supplied to said fuel cell using water content in said gas discharged from said fuel cell;
    a control device for overall control of the fuel cell humidification system;

an air pressure device disposed in said air supply line upstream of said humidification apparatus for supplying air;

switching devices disposed respectively in said air supply line and in said gas discharge line for communicating both of said air supply line and said gas discharge line.

2. A fuel cell humidification system according to claim 1, wherein said fuel cell comprises a solid polymer membrane functioning as a solid electrolyte and a conductivity meter attached to said solid polymer membrane for measuring the humidity of said solid polymer membrane.

3. A fuel cell humidification system according to claim 1, wherein said fuel cell humidification system further comprises a thermometer disposed close to said fuel cell in said air supply line.

4. A fuel cell humidification system according to claim 1, wherein said pressure device comprises a supercharger and a motor for driving said supercharger.

5. A fuel cell humidification system according to claim 1, wherein said switching devices in said air supply line and in said gas discharge line respectively comprises a three way valve and a valve control switch.

6. A fuel cell humidification system provided with a humidification apparatus for humidifying dry air used for a reaction in a fuel cell using water content of a gas discharged from said fuel cell after the reaction, comprising, an air supply line for supplying air to said fuel cell through an air pressure device;

a discharge line for discharging said gas discharged from said fuel cell;

a control device for overall control of the fuel cell humidification system;

a humidification apparatus having a heater disposed across both of said air supply line and said discharge line;

an air pressure device disposed in said air supply line for supplying air to said fuel cell through said humidification device;

switching devices for communicating said air supply line and said gas discharge line;

wherein, said control device controls said switching devices for connecting said air supply line and said gas discharge line so as to form a closed loop and the closed loop is maintained in the closed state when said fuel cell is stopped; and wherein, when said fuel cell is restarted, said control device actuates said air pressure device and turns said heater on for adjusting the dew point of the supply air by circulating gas retained in the closed loop and subsequently opens the closed loop and drives said fuel cell in normal operation.

7. A fuel cell humidification system according to claim 6, wherein said humidification apparatus comprises a fuel cell including a solid polymer membrane and a conductivity meter for measuring the conductivity of said solid polymer membrane; and, when said fuel cell is restarted, said control device outputs a restarting signal for actuating the air pressure device and turning on the heater while the closed loop is maintained in the closed state so that the dew point of the gas retained in the closed loop is regulated such that humidity of said solid polymer membrane is controlled within a predetermined range while monitoring the humidity by said conductivity meter.

8. A fuel cell humidification method according to claim 6 comprising the steps of:

communicating said air supply line and said gas discharge line so as to form a closed loop including said fuel cell and said humidification apparatus when said fuel cell is stopped; and actuating said air pressure device while the closed loop is maintained in the closed state for regulating the dew point of the gas in the closed loop while detecting the gas temperature by the thermometer when said fuel cell is restarted;

detecting a humidity of said solid polymer membrane from measurement by said conductivity meter and the temperature of the supplying air;

starting the fuel cell by no-load operation after opening the three way valves for opening the closed loop when it is determined that said solid polymer membrane is in a predetermined humidity range; and switching said fuel cell from no-load operation to normal operation under load.

9. A computer readable recording medium including a program for executing a fuel cell humidification method according to claim 6 comprising the steps of:

communicating said air supply line and said gas discharge line with a communication line by switching said switching devices so as to form a closed loop including the fuel cell and the humidification apparatus when the fuel cell is stopped; and actuating the air pressure device while the closed loop is maintained in the closed state and turning said heater on by a heater switch for raising the gas temperature while detecting the gas temperature by the thermometer when said fuel cell is restarted;

detecting the humidity of a solid polymer by use of the conductivity meter;

starting said fuel cell by no-load operation after switching the three way valves for opening the closed loop when it is determined by the conductivity meter that said solid polymer membrane is in a predetermined humidity range; and switching said fuel cell from no-load operation to the normal load operation under load.

* * * * *